(12) United States Patent
Abu Rabeah et al.

(10) Patent No.: US 10,894,749 B2
(45) Date of Patent: Jan. 19, 2021

(54) POLYHALITE GRANULATION PROCESS

(71) Applicant: ICL EUROPE COOPERATIEF U.A., Amsterdam (NL)

(72) Inventors: Khalil Abu Rabeah, Beersheba (IL); Ofir Cohen, Arad (IL); Ayoub Alhowashla, Hora (IL); Natalia Geinik, Arad (IL); Ruben Socolovsky, Beersheba (IL); Yacov Levy, Dimona (IL); Marina Dekov, Arad (IL); Joseph Lati, Lehavim (IL)

(73) Assignee: ICL EUROPE COOPERATIEF U.A., Amsterdam (NL)

( * ) Notice: Subject to any disclaimer, the term of this patent is extended or adjusted under 35 U.S.C. 154(b) by 0 days.

(21) Appl. No.: 16/481,183

(22) PCT Filed: Feb. 9, 2018

(86) PCT No.: PCT/IL2018/050150
§ 371 (c)(1),
(2) Date: Jul. 26, 2019

(87) PCT Pub. No.: WO2018/146684
PCT Pub. Date: Aug. 16, 2018

(65) Prior Publication Data
US 2019/0389786 A1    Dec. 26, 2019

Related U.S. Application Data

(60) Provisional application No. 62/457,635, filed on Feb. 10, 2017.

(51) Int. Cl.
*C05G 3/00* (2020.01)
*C05G 5/12* (2020.01)
*C05G 5/40* (2020.01)

(52) U.S. Cl.
CPC ............... *C05G 5/12* (2020.02); *C05G 5/40* (2020.02)

(58) Field of Classification Search
CPC ... C05G 5/40; C05G 5/12; C05G 3/00; C05D 3/00; C05D 1/00; C05D 5/00; B01J 2/00; B01J 2/10; B01J 2/12; B01J 2/16; B01J 2/20
See application file for complete search history.

(56) References Cited

U.S. PATENT DOCUMENTS

| | | | |
|---|---|---|---|
| 2,138,827 A * | 12/1938 | Bailey | C01D 5/10 |
| | | | 71/59 |
| 3,332,470 A | 7/1967 | Chirico | |
| 3,332,827 A | 7/1967 | Griffith | |
| 3,532,621 A | 10/1970 | Hough | |
| 3,548,046 A | 12/1970 | Savage | |
| 3,711,254 A | 1/1973 | McGowan | |
| 3,876,387 A | 4/1975 | Coulson | |
| 3,877,920 A | 4/1975 | Carlberg | |
| 4,283,423 A | 8/1981 | Watkins | |
| 4,963,231 A | 10/1990 | Ryham | |
| 5,112,379 A | 5/1992 | Young | |
| 5,651,888 A | 7/1997 | Shimizu | |
| 6,287,496 B1 | 9/2001 | Lownds | |
| 6,454,979 B1 | 9/2002 | Phinney | |
| 2002/0121117 A1 | 9/2002 | Hartmann | |
| 2004/0139992 A1 | 7/2004 | Murkute | |
| 2005/0072724 A1 | 4/2005 | Nakayama | |
| 2005/0276905 A1 | 12/2005 | Xing | |
| 2006/0144789 A1 | 7/2006 | Cath | |
| 2008/0223098 A1 | 9/2008 | Taulbee | |
| 2009/0261040 A1 | 10/2009 | Pruet | |
| 2009/0272692 A1 | 11/2009 | Kurth | |
| 2010/0213129 A1 | 8/2010 | Jones | |
| 2010/0224476 A1 | 9/2010 | Cath | |
| 2011/0017666 A1 | 1/2011 | Cath | |
| 2011/0064853 A1 | 3/2011 | Maeki | |
| 2011/0123420 A1 | 5/2011 | Phinney | |
| 2011/0257788 A1 | 10/2011 | Wiemers | |
| 2011/0315632 A1 | 12/2011 | Freije, III | |
| 2013/0001162 A1 | 1/2013 | Yangali-Quintanilla | |
| 2013/0264260 A1 | 10/2013 | Heinzl | |
| 2014/0001122 A1 | 1/2014 | Schultz | |

(Continued)

FOREIGN PATENT DOCUMENTS

| | | |
|---|---|---|
| CN | 1091990 A | 9/1994 |
| CN | 1387497 | 12/2002 |

(Continued)

OTHER PUBLICATIONS

Bryan D. Coday et al., "The sweet spot of forward osmosis: Treatment of produced water, drilling wastewater, and other complex and difficult liquid streams" Desalination 333 (2014) 23-35.
Canadian Office Action dated Jul. 12, 2018 for corresponding CA Patent App. No. 2,890,360, 5 pages.
Extended European Search Report for Application No. 16789406.2 dated Dec. 14, 2018, 8 pages.
Indian Examination Report dated Jun. 28, 2018 for IN Application No. 829DELNP2015, 6 pages.
International Search Report and Written Opinion dated Dec. 19, 2013 for corresponding International Patent Application No. PCT/US2013/049166. 7 pages.
Office Action dated Jul. 3, 2018 for U.S. Appl. No. 15/559,424 (pp. 1-9).
Omeman, Z. et al, "Geopolymer cement in concrete: novel sustainable", Cemento-Hormigon , 78(906), 4-19 STNDatabase accession No. 2008:130694 XP002777656.

(Continued)

*Primary Examiner* — Timothy C Vanoy
(74) *Attorney, Agent, or Firm* — Graeser Associates International Inc.; Dvorah Graeser

(57) ABSTRACT

There is provided herein a process for the production of polyhalite granules from fine dry polyhalite powder comprising preparing a binder-water mix and mixing the binder-water mix with the polyhalite powder in a mixer, continuously adding water to the mixer to provide a polyhalite material, discharging the polyhalite material from the mixer and introducing the material into a fluid bed, drying the material and screening the material to receive granules ranging in size between 1.4 mm to 4.75 mm.

7 Claims, No Drawings

(56) References Cited

U.S. PATENT DOCUMENTS

| | | |
|---|---|---|
| 2014/0175011 A1 | 6/2014 | Benton |
| 2014/0223979 A1 | 8/2014 | Wiseman |
| 2014/0245803 A1 | 9/2014 | Forsythe |
| 2015/0014232 A1 | 1/2015 | McGinnis |
| 2015/0101987 A1 | 4/2015 | Yeh |
| 2016/0060182 A1 | 3/2016 | Cook |
| 2017/0305805 A1* | 10/2017 | Farnworth ............... C05G 5/40 |

FOREIGN PATENT DOCUMENTS

| | | | |
|---|---|---|---|
| CN | 1485124 | | 3/2004 |
| CN | 106082279 A | | 11/2016 |
| FR | 2583412 A1 | | 12/1986 |
| GB | 935007 A | | 8/1963 |
| GB | 1378938 | | 12/1974 |
| GB | 2522490 | | 7/2015 |
| GB | 2 577 865 A | * | 4/2020 ............... C05D 1/00 |
| JP | 2003112017 | | 4/2003 |
| KR | 101335445 B1 | | 12/2013 |
| SU | 695018 A1 | | 6/1982 |
| SU | 990756 A | | 1/1983 |
| SU | 1574542 A1 | | 6/1990 |
| WO | 0121556 A1 | | 3/2001 |
| WO | 2009086587 A1 | | 7/2009 |
| WO | 2011053794 A2 | | 5/2011 |
| WO | 2012109723 A1 | | 8/2012 |
| WO | 2012115496 A1 | | 8/2012 |
| WO | 2014181149 A2 | | 11/2014 |
| WO | 2015185907 A1 | | 12/2015 |
| WO | 2015185909 A1 | | 12/2015 |
| WO | 2016051130 A1 | | 4/2016 |
| WO | 2016178211 | | 11/2016 |
| WO | 2018073815 | | 4/2018 |
| WO | 2018109773 | | 6/2018 |
| WO | 2018146684 | | 8/2018 |

OTHER PUBLICATIONS

R. L. Earle., "Chapter 8: Evaporation. Multiple Effect Evaporation", Unit Operations in Food Processing, (Dec. 31, 1983), URL: http://www.nzifst.org.nz/unitoperations/evaporation2.htm, XP055282974, 18 pages.

RU Office Action dated Jul. 31, 2019 for RU Application No. 2017141009 (4 pages).

RU Office Action dated May 15, 2017 for RU Application No. 2015103308 (9 pages).

RU Search Report dated May 5, 2017 for RU Application No. 2015103308 (2 pages).

Russian Search Report for Application No. RU2017141009, dated Jul. 10, 2019, 2 pages.

Unit Operations in Food Processing—R. L Earle, 1983, NZIFST, http://www.nzifst.org.nz/unitoperations/evaporation2.htm. 7 pages.

Written Opinion of the International Search Authority for parent PCT application PCT/IL2016/050436, 6 pages, dated Jul. 2016.

Written Opinion of the International Search Authority for parent PCT application PCT/IL2017/050358 dated Jun. 25, 2017, 6 pages.

Written Opinion of the International Search Authority for parent PCT application PCT/IL2014/050278, dated Sep. 14, 2015. 6 pages.

Office Action dated May 19, 2020 for U.S. Appl. No. 16/343,900 (pp. 1-6).

Office Action dated Apr. 7, 2020, for U.S. Appl. No. 16/343,900 (pp. 1-7).

Office Action dated Feb. 11, 2020, for U.S. Appl. No. 15/570,753 (pp. 1-9).

Office Action dated May 22, 2020 for U.S. Appl. 15/570,753 (pp. 1-11).

Office Action dated May 22, 2020 for U.S. Appl. No. 15/570,753 (pp. 1-11).

Database WPI, Week 198346 Thomson Scientific, London, GB; AN 1983-819450, XP002801001, & SU 990 756 A (Kaluga Khlorvinil) Jan. 23, 1983 (Jan. 23, 1983) (1 page).

Extended European Search Report for App. No. EP18751114.2, dated Nov. 20, 2020, 8 pages.

* cited by examiner

POLYHALITE GRANULATION PROCESS

FIELD OF THE INVENTION

The present invention relates to the field of fertilizers, specifically to production of polyhalite granules to act as a fertilizer.

BACKGROUND OF THE INVENTION

To grow properly, plants need nutrients (nitrogen, potassium, calcium, zinc, magnesium, iron, manganese, etc.) which normally can be found in the soil. Sometimes fertilizers are needed to achieve a desired plant growth as these can enhance the growth of plants.

This growth of plants is met in two ways, the traditional one being additives that provide nutrients. The second mode by which some fertilizers act is to enhance the effectiveness of the soil by modifying its water retention and aeration. Fertilizers typically provide, in varying proportions, three main macronutrients:

Nitrogen (N): leaf growth;
Phosphorus (P): Development of roots, flowers, seeds, fruit;
Potassium (K): Strong stem growth, movement of water in plants, promotion of flowering and fruiting;
three secondary macronutrients: calcium (Ca), magnesium (Mg), and sulphur (S);
micronutrients: copper (Cu), iron (Fe), manganese (Mn), molybdenum (Mo), zinc (Zn), boron (B), and of occasional significance there are silicon (Si), cobalt (Co), and vanadium (V) plus rare mineral catalysts.

The most reliable and effective way to make the availability of nutrients coincide with plant requirements is by controlling their release into the soil solution, using slow release or controlled release fertilizers.

Both slow release fertilizers (SRF) and controlled release fertilizers (CRF) supply nutrients gradually. Yet, slow release fertilizers and controlled release fertilizers differ in many ways: The technology they use, the release mechanism, longevity, release controlling factors and more.

Solid fertilizers include granules, prills, crystals and powders. A prilled fertilizer is a type of granular fertilizer that is nearly spherical made by solidifying free-falling droplets in air or a fluid medium. Most controlled-release fertilizers (CRFs) used in commercial nurseries are prilled fertilizers that have been coated with sulfur or a polymer. These products have been developed to allow a slow release of nutrients into the root zone throughout crop development.

Polyhalite is an evaporite mineral, a hydrated sulfate of potassium, calcium and magnesium with formula: $K_2Ca_2Mg(SO_4)_4 \cdot 2H_2O$. Polyhalite is used as a fertilizer since it contains four important nutrients and is low in chloride:

48% $SO_3$ as sulfate
14% $K_2O$ as from sulfate of potash
6% $MgO$ as from magnesium sulfate
17% $CaO$ as from calcium sulfate

SUMMARY OF THE INVENTION

According to some demonstrative embodiments, there is provided a process for the granulation of polyhalite.

According to some demonstrative embodiments, granules of polyhalite may provide superior characteristics, including for example, a sustained and/or controlled released of the fertilizer to the ground, for example, due to the substantially similar size and/or diameter of the granules.

According to some embodiments, use of polyhalite in granules is also beneficial to prevent the segregation of the polyhalite in a powder mix. Segregation often occurs due to differences in the size or density of the component of the mix. Normally, the smaller and/or denser particles tend to concentrate at the base of the container with the larger and/or less dense ones on the top. An ideal granulation will contain all the polyhalite of the mix in a correct proportion in each granule and segregation of granules will not occur.

According to some demonstrative embodiments, there is provided herein a process for the production of polyhalite granules from fine dry polyhalite powder comprising: preparing a binder-water mix and mixing the binder-water mix with the polyhalite powder in a mixer; continuously adding water to the mixer to provide a polyhalite material; discharging the polyhalite material from the mixer and introducing the material into a fluid bed; drying the material; and screening the material to receive granules ranging in size between 1.4 mm to 4.75 mm.

According to some embodiments, the process may comprise preparing a binder-water mix comprises mixing a binder in a concentration of between 2.5-10% of the feed weight with water in a concentration of between 3-9% of the feed weight.

According to some embodiments, the binder-water mix may be mixed with the polyhalite powder in a mixer for 5-15 minutes.

According to some embodiments, continuously adding water to the mixer to provide a polyhalite material may comprise continuously adding water for at least two more minutes.

According to some embodiments, discharging the material from the mixer and introducing the material into a fluid bed is performed for one minute at 20 degrees.

According to some embodiments, drying the material may be performed at 150 degrees Celsius, for example, in a fluid bed or drum dryer.

DETAILED DESCRIPTION OF THE INVENTION

According to some demonstrative embodiments, there is provided a process for the granulation of polyhalite.

According to some demonstrative embodiments, granules of polyhalite may provide superior characteristics, including for example, a sustained and/or controlled released of the fertilizer to the ground, for example, due to the substantially similar size and/or diameter of the granules.

According to some demonstrative embodiments, the term fertilizer: may include any material of natural or synthetic origin that is applied to soils or to plant tissues to supply one or more plant nutrients essential to the growth of plants, including, for example, Single nutrient ("straight") fertilizers such as Ammonium nitrate, Urea, calcium ammonium nitrate, superphosphate, e.g., "Single superphosphate" (SSP), phosphogypsum, Triple superphosphate (TSP) or a mixture thereof; Multinutrient fertilizers such as Binary (NP, NK, PK) fertilizers, e.g., monoammonium phosphate (MAP) and/or diammonium phosphate (DAP), NPK fertilizers which are three-component fertilizers providing nitrogen, phosphorus, and potassium; fertilizers which include one or more of the main micronutrients sources of iron, manganese, boron, molybdenum, zinc, and copper and the like; Compound fertilizers, e.g., which contain N, P, and K; Organic fertilizers such as peat, animal wastes, plant wastes from agriculture, and sewage sludge; and/or Other elements such as calcium, magnesium, and sulfur.

According to some embodiments, use of polyhalite in granules is also beneficial to prevent the segregation of the polyhalite in a powder mix. Segregation often occurs due to differences in the size or density of the component of the mix. Normally, the smaller and/or denser particles tend to concentrate at the base of the container with the larger and/or less dense ones on the top. An ideal granulation will contain all the polyhalite of the mix in a correct proportion in each granule and segregation of granules will not occur.

According to some demonstrative embodiments, the polyhalite granules are produced from fine material, e.g., powder, having a Particle Size Distribution (PSD) which is too small to be used by other conventional methods, e.g., bulk blending.

According to some embodiments, the fine material (also referred to herein as fine dry polyhalite powder has a PSD of between 0.01 mm-1 mm, preferably between 0.03 mm-0.08 mm.

According to some embodiments, the polyhalite granules of the present invention may have a spherical shape and accordingly blending with other nutrients (via for example bulk blending) may provide a more homogenous composition, the granules may also possess a low tendency of segregation, the granules may also exhibit low tendency to brake into small particles, the granules may also exhibit easy dissolution velocity, the granules may be easily coated and exhibit a low tendency to produce dust, thus diminishing environmental pollution (no dust liberation).

The process can be changed according with the market needs and development, new line of products with different chemically and physically behaviors can be produced.

According to some embodiments, the granules of the present invention may be coated with various coating materials, e.g., for anti-dusting and anticaking purposes, slow release and for the addition of microelements and/or macroelements.

According to some demonstrative embodiments, the granules of the present invention may also include one or more binders which include any suitable material or compound that may mechanically and/or chemically hold or draw other materials together to form a cohesive whole including, for example, organic or inorganic binders, such as, sodium silicate, potassium silicate, flyash, geopolymers, starch, bentonite, lignosulfonates, molasses, hydrated lime, bitumen, Portland cement, clay, acids (nitric, hydrochloric, phosphoric, sulphuric), cellulose gum, sucrose, water, water glass, cements, or combinations thereof.

According to some embodiments, preferably, the binders are sodium silicate, potassium silicate and/or flyash.

According to some demonstrative embodiments, there is provided a process for the production of polyhalite granules which includes:

Filling a mixer with dry polyhalite and mixing for one minute Mixing a binder, for example, in a concentration of between 2.5-10% of the feed weight, preferably 5%, with water for example, in a concentration of between 3-9% of the feed weight, preferably 6%, in a separate vessel, to provide for a binder-water mix;

Adding the binder-water mix to the mixer including the polyhalite and mixing for 5-15 minutes;

Adding 0.5% water without stopping the mixer and mixing for at least two more minutes;

Discharging the material from the mixer and introducing the material into fluid bed for one minute at 20 degrees Celsius;

Drying the material at 150 degrees Celsius in fluid bed or drum dryer; and Screening the material to receive granules ranging in size between 1.4 mm to 4.75 mm

EXAMPLES

Example-1

Mixer velocity: 350 rpm (7.3 M/sec linear velocity)
Choper velocity: 1500 rpm
Residence time 7'10 min,
The yield is approximately 50-70%. The sequence of the process:
1—Fill the mixer and mix one minute and stop.
2—Mix the binder (5% of the feed weight) with the water (6% of the feed weight) in a small vessel (the mix).
3—Add the mix (binder+water) to the mixer and start it and the chopper during 5 minutes.
4—Add water to the mixer in an amount equal to 0.5% of the feed weight without stopping and after the water addition stop the chopper.
5—Continue to mixing two additional minutes
6—Discharge the material
7—Introduce the material into fluid bed one minute at 20 degrees
8—Dry the material at 150 degrees five minutes.
9—Screen the material 1.4 mm to 4.75 mm
Drum Trials Drum trials were conducted in drum that have 80 cm diameter. Rotation velocity 20 rpm. Water were added by spray by nozzle at 4 atm. 20 Kg of Polyhalite were mixed with weighted binders for 1 minute at 300 rpm. Water was added on the materials and rotated for additional time.

The granules were dried at 150 degree for 20 minutes.

Example-2

Binder quantity 3-5% fly ash. Added water 5-7.5%, granulation time 7-8 minutes.

Granules strength before humidity 1.7-2.9 Kg/granule and after humidity at 77% for 24 hours 0.7-1.6 Kg/granule. the yields were 60-67%.

Example 3

As example 2 with 4% of fly ash+1% of Calcium Hydroxide. Granulation time 7 minutes. Strength of granule before humidity 2.6-3.5 Kg/granule and 1.6-1.8 Kg/granule after humidity. the yields were between 52-74%.

Example 4

As example 2. 2% of fly ash+1% of Calcium Hydroxide. Strength of granule before humidity 2.6 Kg/granule and 1.5 Kg/granule after humidity. The yield was 43%.

Plow Share Trials

The plow share has volume of 1000 Lit. Filling materials at 15%. The Velocity was 300 rpm and Chopper velocity was 1500 rpm.

10-15 Kg of Polyhalite mixed with weighted binders for 1 minute at 300 rpm. Water were added and continue to mixed foe additional time, then the granules were dried at 150 degree for 20 minutes.

Example 5

10 kg of Polyhalite, was mixed with 7% of fly ash+5% of Calcium Hydroxide for 1 minute Water was added and mixed 5 minutes. The product was dried. The Strength of the granules before humidity 4 Kg/granule. and 1.9-2.1 after humidity at 77% for 24 hours and 1.7 Kg/granule after 72 hours at 77% humidity.

Example 6

15 kg of Polyhalite, was mixed with 6.5% of fly ash+2.-4% of Calcium Hydroxide for 1 minute Water was added and mixed 5 minutes. The product was dried. The Strength of the granules before humidity 2.2-2.9 Kg/granule. and 0.4-0.8 after humidity at 77% for 24 hours and 1.7 Kg/granule after 72 hours at 77% humidity.

Example 7

150 Lit plow share. Filling with materials to 40%. velocity 300 rpm. Chopper velocity 1500 rpm. The Polyhalite mixed with weighted binders 4% fly ash and 1% Calcium hydroxide for 1 minute at 300 rpm. Water were added and mixed for 5 minutes. The product was dried for 10 minutes at 140 degrees and screened.

The average PSD was 1.4-4.75 mm. The single strength of the granules were 3.6-4.3 Kg/granules before humidity and 1.4-1.5 KG/granule after humidity at 77 and 86% for 24 hours. Collective strength 77-78%. Caking 0.3 Kg, and the yield 62-73%. After 180 days the single strength of the granules was 2.8-2.9 Kg/granules collective 68-71%, and caking 2.7 Kg. While this invention has been described in terms of some specific examples, many modifications and variations are possible. It is therefore understood that within the scope of the appended claims, the invention may be realized otherwise than as specifically described.

The invention claimed is:

1. A process for the production of polyhalite granules from fine dry polyhalite powder comprising:
    preparing a binder-water mix and mixing the binder-water mix with the polyhalite powder in a mixer;
    continuously adding water to the mixer to provide a polyhalite material;
    Discharging the polyhalite material from the mixer and introducing the material into a fluid bed;
    Drying the material; and
    Screening the material to receive granules ranging in size between 1.4 mm to 4.75 mm.

2. The process of claim 1, wherein preparing a binder-water mix comprises mixing a binder in a concentration of between 2.5-10% of the feed weight with water in a concentration of between 3-9% of the feed weight.

3. The process of claim 1, wherein the binder-water mix is mixed with the polyhalite powder in a mixer for 5-15 minutes.

4. The process of claim 1, wherein continuously adding water to the mixer to provide a polyhalite material comprises continuously adding water for at least two more minutes.

5. The process of claim 1, wherein discharging the material from the mixer and introducing the material into a fluid bed is performed for one minute at 20 degrees.

6. The process of claim 1, wherein drying the material is performed at 150 degrees.

7. The process of claim 6, wherein said drying is performed in a fluid bed or drum dryer.

* * * * *